United States Patent
Keeton

(10) Patent No.: US 9,488,535 B2
(45) Date of Patent: Nov. 8, 2016

(54) BATTERY PACK THERMISTOR TEST METHOD

(71) Applicant: FORD GLOBAL TECHNOLOGIES, LLC, Dearborn, MI (US)

(72) Inventor: Robert C Keeton, Willis, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 599 days.

(21) Appl. No.: 13/921,000

(22) Filed: Jun. 18, 2013

(65) Prior Publication Data

US 2014/0369376 A1    Dec. 18, 2014

(51) Int. Cl.
G01K 1/00 (2006.01)
H02J 7/04 (2006.01)
G01K 15/00 (2006.01)

(52) U.S. Cl.
CPC ......... *G01K 15/007* (2013.01); *G01K 2205/00* (2013.01)

(58) Field of Classification Search
USPC ........................................................ 324/426
See application file for complete search history.

(56) References Cited

U.S. PATENT DOCUMENTS

| | | | | |
|---|---|---|---|---|
| 4,659,994 A | * | 4/1987 | Poljak | G01R 31/3627 320/132 |
| 5,600,226 A | * | 2/1997 | Falcon | H02J 7/0093 320/129 |
| 5,652,502 A | * | 7/1997 | van Phuoc | G01R 31/3655 320/134 |
| 7,545,147 B2 | | 6/2009 | Hart et al. | |
| 7,714,736 B2 | * | 5/2010 | Gielniak | G01R 31/3679 320/104 |
| 8,314,623 B2 | | 11/2012 | Nelson et al. | |
| 2004/0145352 A1 | * | 7/2004 | Harrison | H02J 7/0029 320/150 |
| 2008/0169818 A1 | * | 7/2008 | Lesesky | G01R 31/007 324/426 |
| 2009/0316752 A1 | | 12/2009 | Kawase et al. | |

FOREIGN PATENT DOCUMENTS

JP    5035428 B2    9/2012

* cited by examiner

*Primary Examiner* — Lisa Caputo
*Assistant Examiner* — Nasir U Ahmed
(74) *Attorney, Agent, or Firm* — David Kelley, Esq.; Tung & Associates

(57) ABSTRACT

A battery pack thermistor test method includes charging a battery pack, monitoring a rise in average temperature reported by at least one thermistor on the battery pack over a predetermined time period, preparing at least one thermistor slope by calculating a least square fit of time vs. temperature for the at least one thermistor and comparing the at least one thermistor slope to process-defined thermistor slope limits.

8 Claims, 4 Drawing Sheets

BATTERY PACK THERMISTOR TEST METHOD

FIELD

Illustrative embodiments of the disclosure generally relate to battery packs for hybrid electric vehicles (HEVs) and electric vehicles (EVs). More particularly, illustrative embodiments of the disclosure relate to a battery pack thermistor test method for testing HEV/EV battery pack thermistors by thermally stressing battery pack cells in the battery pack.

BACKGROUND

Thermal management of lithium-ion battery packs is necessary for safe operation and maximum performance. The temperature of cells within the battery pack may be monitored by an array of thermistors. In order for it to properly measure changes in the cell temperature, a thermistor must have adequate contact pressure with the battery pack cell and free of any contamination between the thermistor and the cell. Variation in material-handling and assembly processes may affect such contact pressure and contamination. A simple check of the output of the thermistors with no thermal changes within the battery pack may not properly ensure that the thermistors are interfacing with the battery cells as intended. It may be necessary to generate a specific thermal response from the battery cell and verify that the dynamic temperature-indicating output of the thermistor is within acceptable limits to ensure that the thermistors can detect the appropriate thermal change in a battery cell.

Accordingly, a battery pack thermistor test method for testing HEV/EV battery pack thermistors by thermally stressing battery pack cells in the battery pack may be desirable for some applications.

SUMMARY

Illustrative embodiments of the disclosure are generally directed to a battery pack thermistor test method. An illustrative embodiment of the method includes charging a battery pack, monitoring a rise in average temperature reported by at least one thermistor on the battery pack over a predetermined time period, preparing at least one thermistor slope by calculating a least square fit of time vs. temperature for the at least one thermistor and comparing the at least one thermistor slope to process-defined thermistor slope limits.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Illustrative embodiments of the disclosure are generally directed to a battery pack thermistor test method for testing HEV/EV battery pack thermistors by thermally stressing battery pack cells in the battery pack. By applying a controlled charge profile to the battery pack cells prior to charging the battery pack with no active thermal-management system enabled, a specific amount of heat can be generated within the cells. The thermistors, by design, should be in direct contact with the battery pack cells. By monitoring a slope change in the average temperature reported by the thermistors, followed by a fixed delay, the thermistor performance can be characterized by measuring a least-squares linear fit slope to the thermal response for a small window of time. According to Newton's 2nd Cooling Law, the rate of change in temperature is a function of the difference between the cell temperature and the ambient temperature around the cell. Since the test may be performed with the initial charging of the battery pack via a specific charge profile, the heat generated within the cell is repeatable and there exists a minimal difference between the temperature of the cell and the ambient temperature. Additionally, since the thermal-management system is not enabled, the heat exchange rate is likewise minimal.

Figure 1:
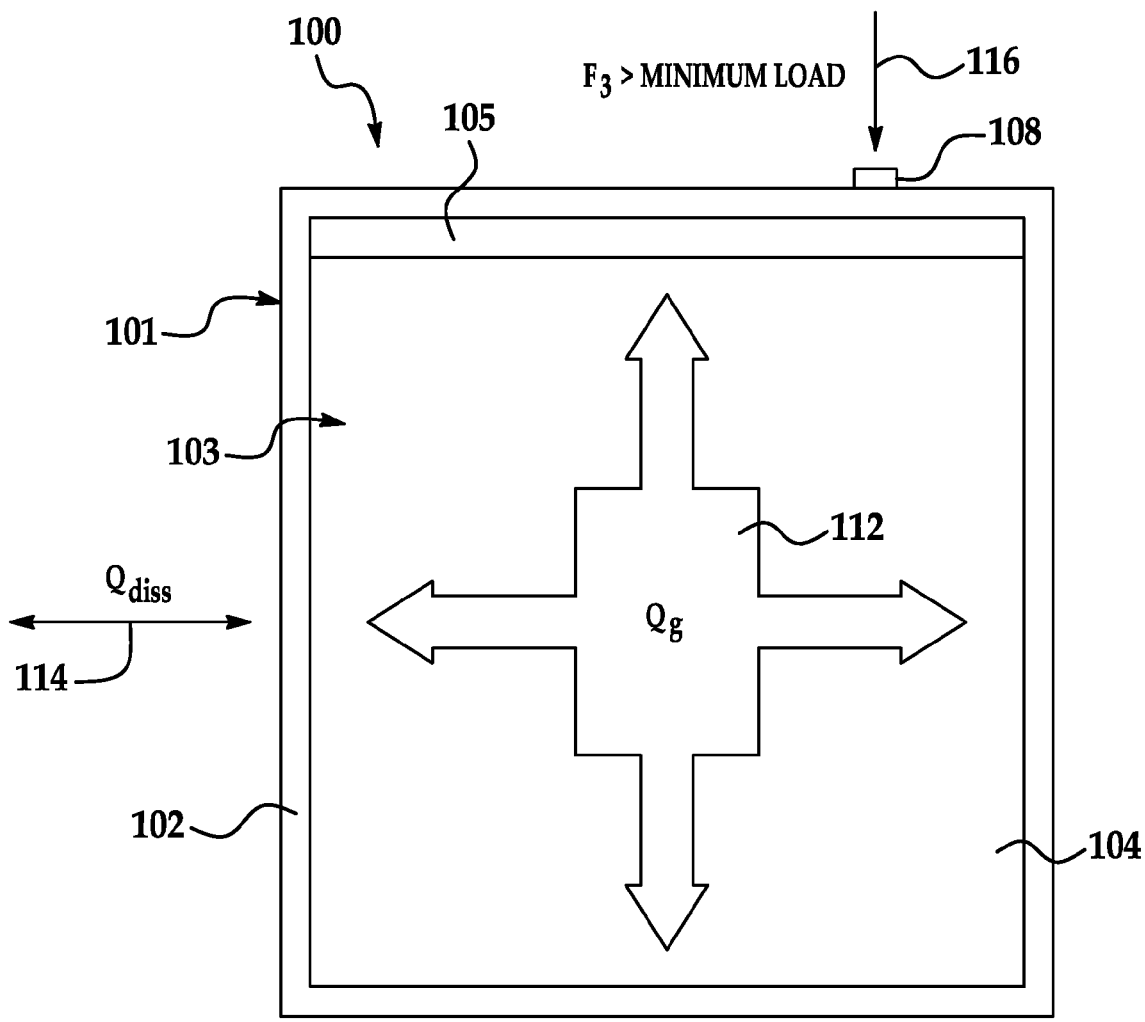
FIG. 1 is a schematic diagram which illustrates an exemplary battery pack cell in implementation of an illustrative embodiment of the battery pack thermistor test method.

Referring initially to FIG. 1, an exemplary battery pack cell in implementation of an illustrative embodiment of the battery pack thermistor test method is generally indicated by reference numeral 101. The battery pack cell 101 may be part of a battery pack 100 which is suitable for implementation in an HEV (hybrid electric vehicle) or an EV (electric vehicle), for example and without limitation. The battery pack cell 101 may include a cell wall 102 which encloses a cell interior 103. An electrolyte solution 104 may be provided in the cell interior 103. Gases 105 may be contained in the cell interior 103 above the electrolyte solution 104. At least one thermistor 108 may be provided on the exterior of the cell wall 102 and in thermal contact with the battery pack cell 101. The thermistor 108 may be adapted to measure the temperature of the battery pack cell 101 to determine whether the measured temperature falls within the optimum operational parameters of the battery pack 100.

As will be hereinafter further described, the battery pack thermistor test method may include applying thermal stress 116 to the battery pack cell 101. Generated heat 112 is generated in the electrolyte solution 104. Dissipated heat 114 emanates from the battery pack cell 101 responsive to the generated heat 112. According to the energy conservation law:

$$\dot{Q} = \underbrace{\dot{Q}_g}_{generated} - \underbrace{\dot{Q}_{diss}}_{heat\ dissipated}$$

$$\underbrace{\dot{T} \sum_j m_j c_j}_{\dot{Q}} = \underbrace{i^2 R(T)}_{\dot{Q}_g} - \underbrace{UA_s(T - T_\infty)}_{\dot{Q}_{diss}}$$

$$\dot{T} = \frac{i^2 R(T) - UA_s(T - T_\infty)}{\sum_j m_j c_j}$$

In order to generate a thermal response $\dot{T}$ within the battery pack cell 101, a charge current i must be supplied to the battery pack cell 101. In addition, to maximize heat, the internal resistance R(T) may be elevated. When lithium-ion battery pack cells 101 are at a low State Of Charge (SOC), the impedance is greater in comparison to a charged cell. Internal resistance is also a function of temperature, so maintaining a controlled environment aids in accuracy. The variation in mass $m_j$ of the various elements that comprise the battery pack cell 101 and the heat transfer coefficients $c_j$ of the materials are relatively insignificant and may be treated as constants.

Since energy dissipation $\dot{Q}_{diss}$ affects the thermal response, it is best to have the battery cell temperature T stabilized at room temperature $T_\infty$ so the dissipation will be minimal and can be ignored.

Figure 2:
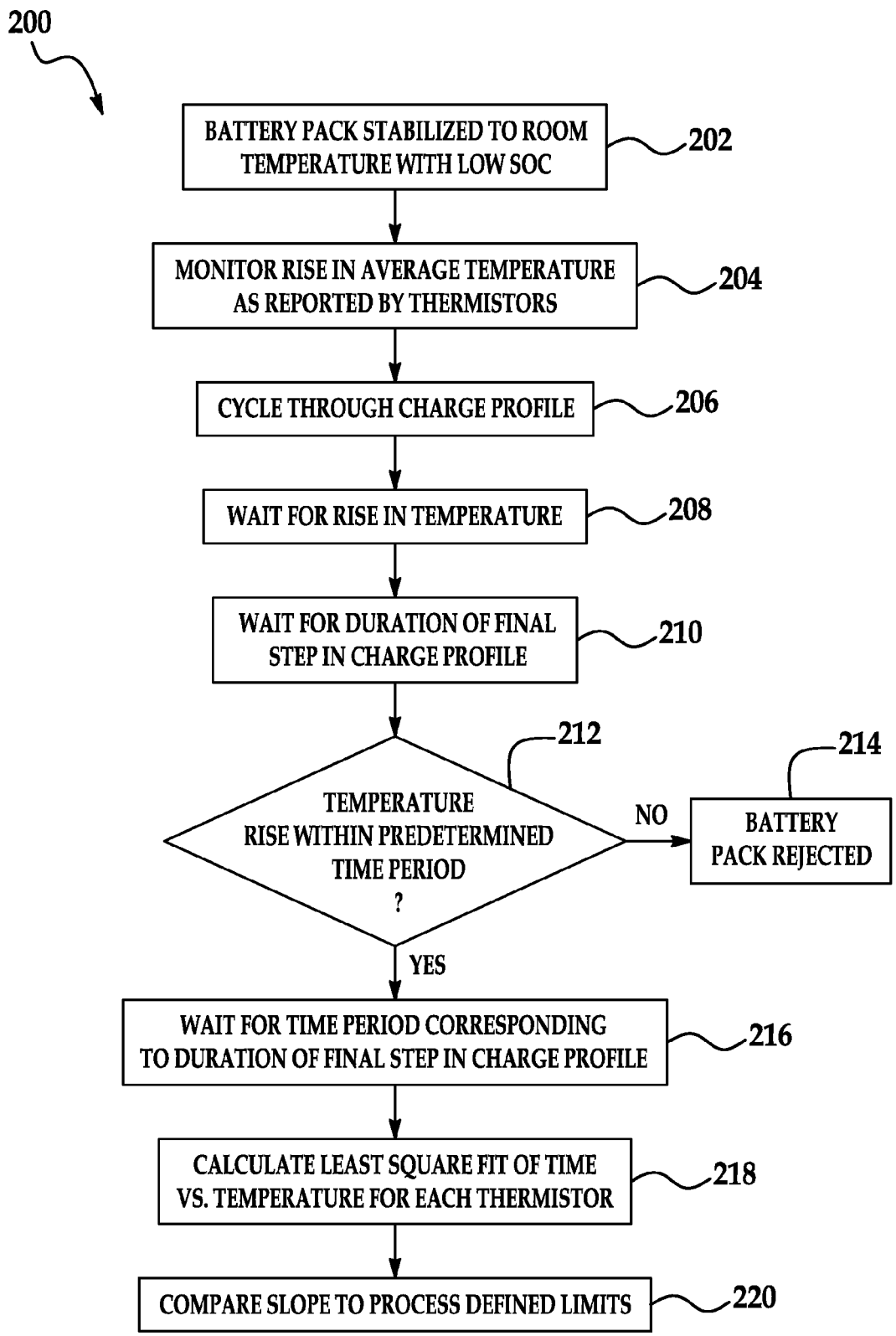
FIG. 2 is a flow diagram of an illustrative embodiment of the battery pack thermistor test method.

Referring next to FIG. 2, a flow diagram 200 of an illustrative embodiment of the battery pack thermistor test method is shown. In block 202, a battery pack is stabilized to room temperature with a low SOC (state of charge), such as not greater than about 10%. In block 204, a rise in average temperature of the battery pack cells in the battery pack, as reported by the thermistors, is measured. In some embodiments, a rise in average temperature may be defined as the point in time at which the rate of change in temperature exceeds a specified amount based on the specific battery pack design. In block 206, the battery pack is cycled through a charge profile which is specific to the battery pack under test. The charge profile may be a stepped current of constant durations of a predetermined stepped time period, such as approximately 5.0 seconds each, for example and without limitation. The final step of the charge profile may correspond to the peak current which the battery pack and the battery pack cell can withstand for a predetermined peak current time period, such as about 10.0 seconds, for example and without limitation.

In block 208, a rise in temperature as reported by the thermistors is awaited. In block 210, the peak current time period, or duration of the final step in the charge profile applied to the battery pack, is awaited. In block 212, a determination may be made as to whether the temperature rises within a predetermined temperature rise period of time. If the temperature does not rise within the predetermined temperature rise period of time (such as 75.0 seconds, for example and without limitation), then the thermistors may be operationally deficient and the battery pack may be rejected in block 214. If the temperature does rise within the predetermined temperature rise period of time, the peak current time period which corresponds to the duration of the final step in the charge profile (such as 10.0 seconds, for example and without limitation) may be awaited in block 216. In block 218, the least square fit of time vs. temperature for each thermistor may be calculated. In block 220, the slope of the line made in block 218 may be compared to process-defined thermistor slope limits. If the thermistor slope is not within the thermistor slope limits, the battery pack may be rejected.

Figures 3, 4:
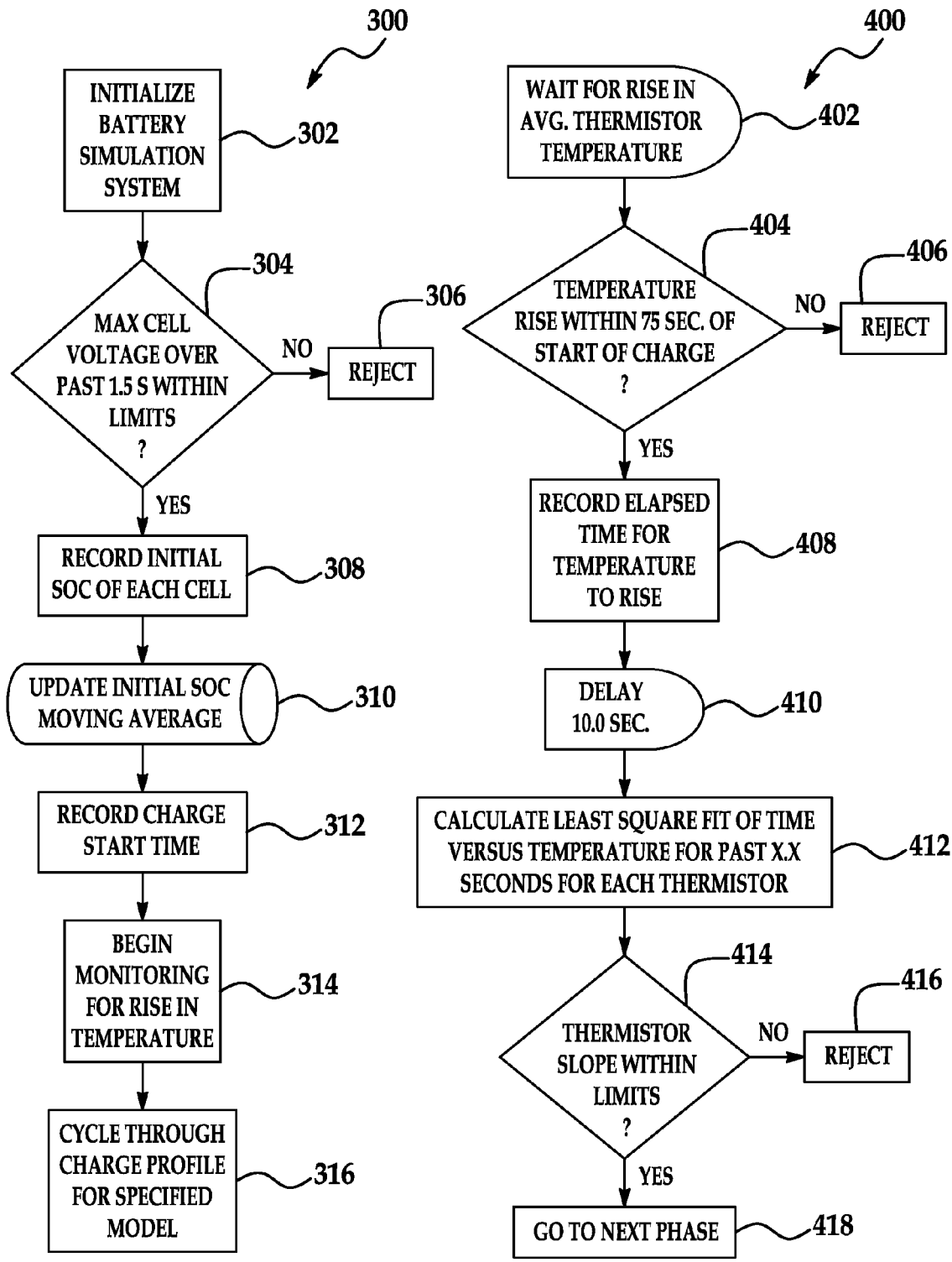
FIG. 3 is a flow diagram which illustrates an exemplary setup method according to an illustrative embodiment of the battery pack thermistor test method.
FIG. 4 is a flow diagram which illustrates exemplary thermistor evaluation according to an illustrative embodiment of the battery pack thermistor test method.

Referring next to FIG. 3, a flow diagram 300 which illustrates an exemplary setup method according to an illustrative embodiment of the battery pack thermistor method is shown. In block 302, a battery simulation system may be initialized. In block 304, a determination may be made as to whether the maximum cell voltage over a past predetermined cell voltage time period (such as 1.5 seconds, for example and without limitation) is within predetermined cell voltage limits. If the maximum cell voltage over the past predetermined cell voltage time period is not within the predetermined cell voltage limits, the battery pack may be rejected in block 306. If the maximum cell voltage over the past predetermined cell voltage time period is within the predetermined cell voltage limits, the initial SOC (state of charge) of each cell in the battery pack may be measured and recorded in block 308. In block 310, the initial SOC moving average of the cells in the battery pack may be updated. In block 312, a charge start time may be recorded. In block 314, the cells in the battery pack may be monitored for a rise in temperature. In block 316, the charge profile may be cycled through for a specified model.

Figure 5:
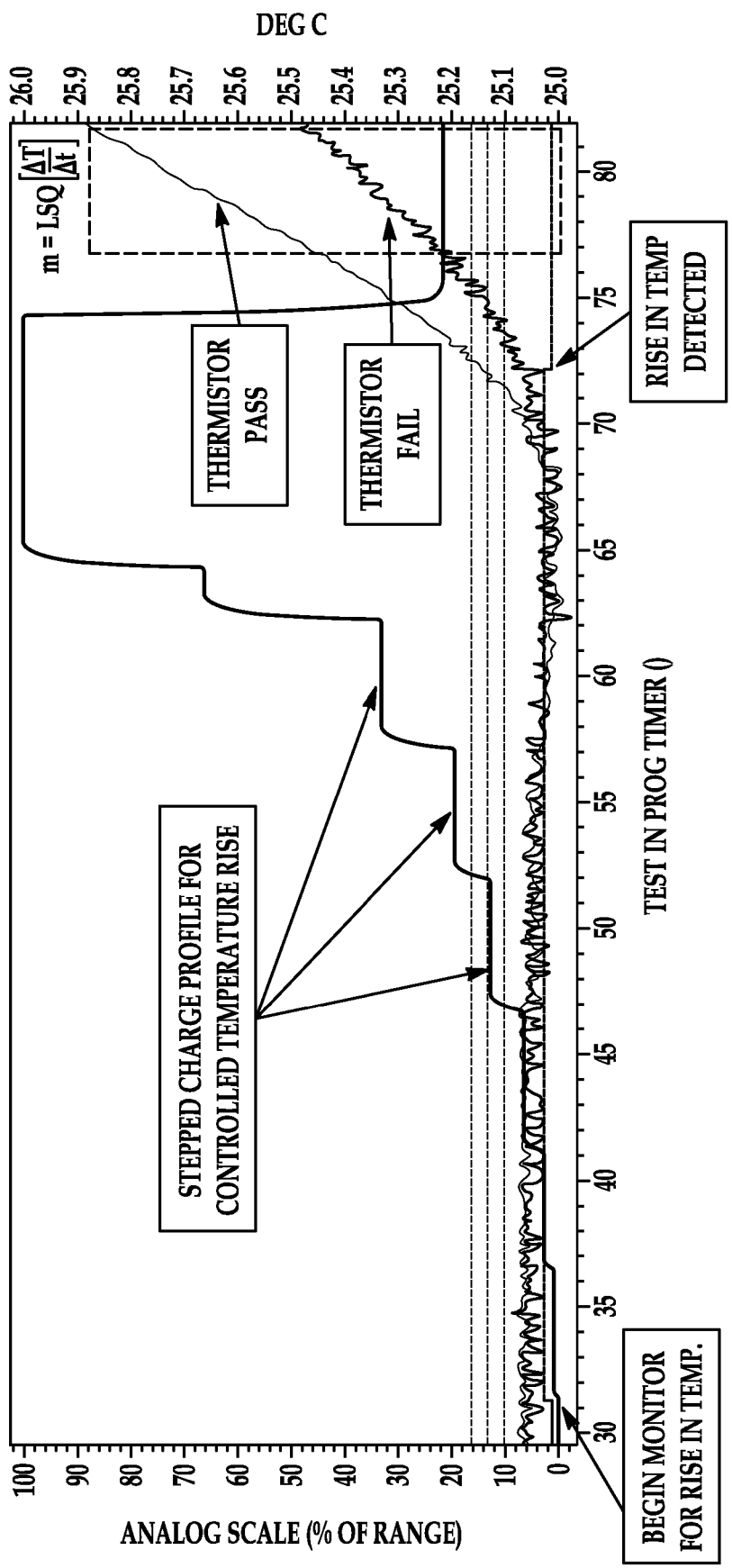
FIG. 5 is a graph which illustrates an exemplary thermistor test according to an illustrative embodiment of the battery pack thermistor test method.

Referring next to FIG. 4, a flow diagram 400 which illustrates exemplary thermistor evaluation according to an illustrative embodiment of the battery pack thermistor method is shown. In block 402, a rise in average thermistor temperature may be awaited. In block 404, a determination may be made as to whether the average thermistor temperature rise is within a predetermined thermistor temperature rise time period of the beginning of charging, such as 75 seconds, for example and without limitation. If the average thermistor temperature rise is not within the predetermined thermistor temperature rise time period from the beginning of charging, the battery pack may be rejected (block 406). In block 408, if the average thermistor temperature rise is within the predetermined thermistor temperature rise time period from the beginning of charging, the elapsed time for the average thermistor temperature to rise may be recorded. In block 410, a delay which corresponds to the duration of the final step in the charge profile may be awaited. In some embodiments, the delay may be about 10.0 seconds. In block 412, the least square fit of time vs. temperature for a past predetermined time period may be calculated for each thermistor. In block 414, a determination may be made as to whether the thermistor slope is within limits. If the thermistor slope is not within limits, the battery pack may be rejected (block 416). If the thermistor slope is within limits, the method may end at block 418. An exemplary thermistor test according to an illustrative embodiment of the battery pack thermistor method is shown in FIG. 5.

Although the embodiments of this disclosure have been described with respect to certain exemplary embodiments, it is to be understood that the specific embodiments are for purposes of illustration and not limitation, as other variations will occur to those of skill in the art.

What is claimed is:
1. A battery pack thermistor test method, comprising:
  charging a battery pack;

monitoring a rise in average temperature reported by at least one thermistor on the battery pack over a predetermined time period following a start of said charging;

preparing at least one thermistor slope by calculating a least square fit of time vs. temperature for the at least one thermistor over a selected time period following said charging; and comparing the at least one thermistor slope to pre-defined thermistor slope limits.

2. The method of claim 1 wherein charging a battery pack comprises applying a controlled charge profile to a battery pack cell in the battery pack.

3. The method of claim 2 wherein applying a controlled charge profile comprises applying a stepped current over a predetermined time period.

4. The method of claim 3 wherein applying a stepped current comprises applying a stepped current of constant durations over a predetermined time period.

5. The method of claim 4 wherein applying a stepped current of constant durations over a predetermined time period comprises applying a stepped current of constant durations of about 5.0 seconds each.

6. The method of claim 3 wherein applying a stepped current over a predetermined time period comprises applying a stepped current having a final step corresponding to a predetermined peak current.

7. The method of claim 6 wherein applying a stepped current having a final step corresponding to a predetermined peak current comprises applying a stepped current of about 10.0 seconds.

8. The method of claim 1 further comprising rejecting the battery pack if the thermistor slope falls outside the thermistor slope limits.

* * * * *